United States Patent
Stroebel et al.

(10) Patent No.: US 10,122,815 B1
(45) Date of Patent: Nov. 6, 2018

(54) DYNAMIC CLASS MAPPING IN MESSAGING MIDDLEWARE

(71) Applicant: Sprint Communications Company L.P., Overland Park, KS (US)

(72) Inventors: Stefan Stroebel, Shawnee, KS (US); Brian J. Washburn, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 161 days.

(21) Appl. No.: 15/229,117

(22) Filed: Aug. 5, 2016

(51) Int. Cl.
*H04L 29/08* (2006.01)
*H04L 29/06* (2006.01)
*H04L 12/26* (2006.01)
*H04L 12/707* (2013.01)
*G06Q 40/02* (2012.01)
*G06Q 30/00* (2012.01)
*G06F 15/177* (2006.01)
*G06F 15/173* (2006.01)

(52) U.S. Cl.
CPC ....... *H04L 67/2809* (2013.01); *G06Q 40/025* (2013.01); *H04L 43/0817* (2013.01); *H04L 43/16* (2013.01); *H04L 45/22* (2013.01); *H04L 67/42* (2013.01); *H04L 69/28* (2013.01); *G06F 15/173* (2013.01); *G06F 15/177* (2013.01); *G06Q 30/00* (2013.01)

(58) Field of Classification Search
None
See application file for complete search history.

(56) References Cited

U.S. PATENT DOCUMENTS

| | | | | |
|---|---|---|---|---|
| 2002/0103712 A1* | 8/2002 | Rollins | ............ | G06Q 20/02 705/26.8 |
| 2003/0182194 A1* | 9/2003 | Choey | ............ | G06Q 20/04 705/16 |
| 2006/0059253 A1* | 3/2006 | Goodman | ............ | G06Q 10/06 709/223 |
| 2010/0318827 A1* | 12/2010 | Shah | ............ | G06F 1/3203 713/324 |
| 2011/0047045 A1* | 2/2011 | Brody | ............ | G06Q 20/0655 705/26.41 |
| 2012/0080530 A1* | 4/2012 | Martin | ............ | G06Q 30/00 235/494 |

* cited by examiner

Primary Examiner — Viet D Vu
Assistant Examiner — James A Edwards

(57) ABSTRACT

A method of handling requests for service by client applications. The method comprises receiving a client request by a proxy application from a client application, where the client request identifies the client application, a business transaction type, and a business transaction service platform, reading a mapping configuration file by the proxy application, where the mapping configuration file maps signatures comprising a client application identity, a business transaction type identity, and a business transaction service platform identity to an action, the action comprising one of executing a stubbed out function on the messaging middleware platform and performing a business transaction on a business transaction service platform, based on reading the mapping configuration file, building a business transaction request by the proxy application, and sending by the proxy application the business transaction request to the business transaction service platform identified in the client request.

20 Claims, 8 Drawing Sheets

DYNAMIC CLASS MAPPING IN MESSAGING MIDDLEWARE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprises may deploy a variety of information technology resources to perform automated tasks that support the day-to-day activities of the business. Applications that are used by business groups or users may be referred to as front-end applications in some contexts. These front-end applications may send requests for information or business transactions to other applications, for example applications that provide access to large enterprise data bases or to applications supported by third parties outside of the enterprise. For example, a large retail front-end application may call upon credit checking services provided via the back-end by third party credit checking services and/or applications. In some enterprises, a messaging middleware layer may be disposed between the front-end applications and the back-end applications to promote efficient computing operations and to decouple front-end applications from back-end applications.

SUMMARY

In an embodiment, a method of handling requests for service by client applications executing on remote computer systems is disclosed. The method comprises receiving a client request by a business transaction proxy application executing on a messaging middleware computer system from a client application executing on a remote computer system, where the client request identifies the client application, identifies a business transaction type, and identifies a business transaction service platform and, in response to receiving the client request, reading a business transaction mapping configuration file by the business transaction proxy application, where the business transaction proxy application reads the business transaction mapping configuration file each time it receives a different client request and where the business transaction mapping configuration file maps signatures comprising a client application identity, a business transaction type identity, and a business transaction service platform identity to an action, the action comprising one of executing a stubbed out function on the messaging middleware platform and performing a business transaction on a business transaction service platform. The method further comprises, based on reading the business transaction mapping configuration file, building a business transaction request by the business transaction proxy application and sending by the business transaction proxy application the business transaction request to the business transaction service platform identified in the client request via the messaging middleware computer system, whereby the business transaction proxy application is able to dynamically change handling of client requests in response to a change in the business transaction mapping configuration file without rebooting the business transaction proxy application and without rebooting the messaging middleware computer system.

In another embodiment, a server computer system is disclosed. The server computer system comprises a processor, a non-transitory memory storing a business transaction mapping configuration file, where the business transaction mapping configuration file maps signatures comprising a client application identity, a business transaction type identity, and a business transaction service platform identity to an action, the action comprising one of executing a stubbed out function on a messaging middleware platform and performing a business transaction on a business transaction service platform, and a business transaction proxy application stored in the non-transitory memory. When executed by the processor the business transaction proxy application receives a client request from a client application executing on a remote computer system, where the client request identifies the client application, identifies a business transaction type, and identifies a business transaction service platform, in response to receiving the client request, reads the business transaction mapping configuration file, where the business transaction proxy application reads the business transaction mapping configuration file each time it receives a different client request, based on reading the business transaction mapping configuration file, builds a business transaction request, and sends by the business transaction proxy application the business transaction request to the business transaction service platform identified in the client request via the messaging middleware platform.

In yet another embodiment a method of handling requests for service by client applications executing on remote computer systems is disclosed. The method comprises receiving a first client request by a business transaction proxy application executing on a messaging middleware computer system from a first client application executing on a remote computer system, where the first client request identifies the first client application, identifies a first business transaction type, and identifies a first business transaction service platform and, in response to receiving the first client request, reading a first version of a business transaction mapping configuration file by the business transaction proxy application, where the business transaction proxy application reads the business transaction mapping configuration file each time it receives a client request, where the business transaction mapping configuration file maps signatures comprising a client application identity, a business transaction type identity, and a business transaction service platform identity to an action, the action comprising one of executing a stubbed out function on the messaging middleware platform and performing a business transaction on a business transaction service platform, and where the first version of the business transaction mapping configuration file comprises a mapping of the first client application identity, the first business transaction type identity, and the first business transaction service platform identity to a first business transaction of the first business transaction service platform. The method further comprises, based on reading the first version of the business transaction mapping configuration file, building a first business transaction request by the business transaction proxy application that requests the first business transaction service platform to perform the first business transaction, and sending by the business transaction proxy application the first business transaction request to the first business transaction service platform via the messaging middleware computer system. The method further comprises revising the first version of the business transaction mapping configuration file to a second version of the business transaction mapping configuration file that comprises a mapping of the first client application identity, the first business transaction type identity, and the first business transaction service platform identity to a second business transaction on a second business transaction service platform and receiving a second client request by the business transaction proxy application from the first client application, where the second client request identifies the first client application, identifies the first business transaction type, and identifies the first business transaction service platform. The method further comprises, in response to receiving the second client request, reading the second version of the business transaction mapping configuration file by the business transaction proxy application; based on reading the second version of the business transaction mapping configuration file, building a second business transaction request by the business transaction proxy application that requests the second business transaction service platform to perform the second business transaction, and sending by the business transaction proxy application the second business transaction request to the second business transaction service platform via the messaging middleware computer system, wherein the business transaction proxy application is not rebooted between reading the first version of the business transaction mapping configuration file, sending the first business transaction request to the first business transaction service platform, reading the second version of the business transaction mapping configuration file, and sending the second business transaction request to the second business transaction service platform.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
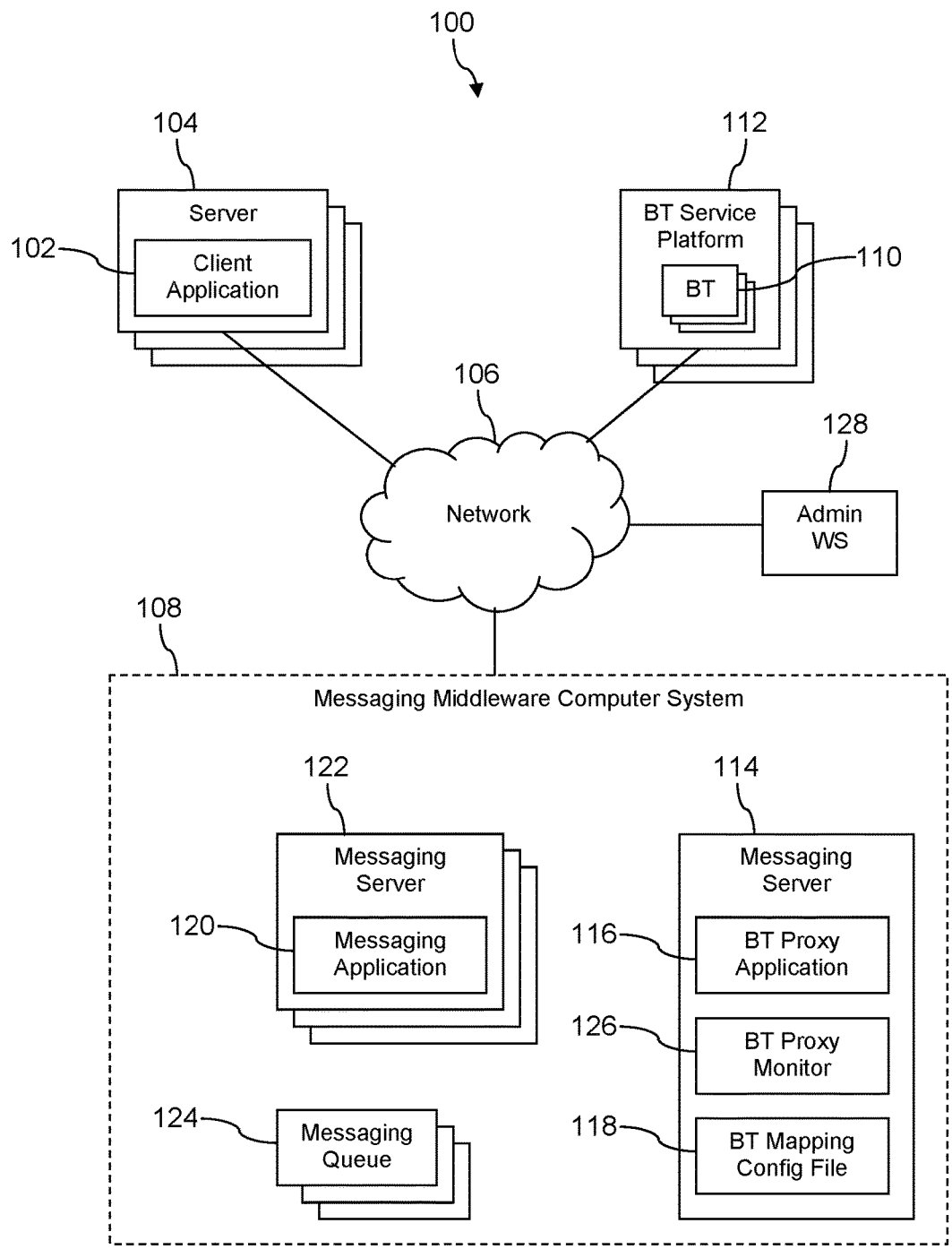
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a proxy application dynamically mapping service requests to service platforms based on reading a configuration file every time it performs a mapping. In this way, a change to the fulfillment of service requests can be achieved very quickly and without causing an outage by rebooting the proxy application. As an example, a front-end client application sends a request for a business transaction to a messaging middleware layer. The request identifies the client application, the type of business transaction, and the destination business transaction platform. The proxy application receives the request and reads the configuration file to find an entry having a key or signature that corresponds to the specific identities contained in the request: the identity of the client application, the identity of the business transaction type, and the identity of the business transaction platform. If no such entry is found or the entry is commented out, the proxy application drops the request and performs no further processing on the request (i.e., the proxy application ignores the client request). If an entry is found, the proxy application performs the action or processing of the client request that is defined by the entry. This definition may include forwarding the client request to the business transaction platform identified in the client request, forwarding the client request to a business transaction platform that is different from the platform identified in the client request, executing a script on a server in the messaging middleware layer, or performing processing on the client request by the proxy application itself.

For example, the proxy application can route a client request matching a specific predefined signature to a script that provides a stubbed-out or placebo response to the client. This may be useful, for example, when testing separate software components under development or when a planned roll-out of multiple separate components vary from schedule. As another example, the proxy application can route a client request to itself for handling, for example for piping data to a cache when a data store goes down temporarily. After the subject data store has been restored to service, the configuration file can be altered to route the data to the data store. An administrator may take action to move the data piped to the cache to the restored data store.

The system taught by the present disclosure is an improved computer system. The large volume of client requests for business transactions performed by back-end service platforms are inherently processed by a computer system. The processing described herein is an improvement of more conventional methods of processing client requests by messaging middleware systems. The proxy application disclosed herein executes on messaging middleware computing resources. When the configuration file is changed to redefine the mapping of a client request signature to a treatment or processing task, neither the proxy application nor the messaging middleware systems are rebooted in order for the changed client request handling to take effect, because the proxy application reads from the configuration file when processing each client request.

In one example use case, a front-end application may request credit checks in real-time to support on-line retail purchasing transactions. The credit check may be directed to a first third party credit check service. In the event that the first credit check service goes out of service (a communication link outage, a system crash, a denial of service attack, or other reason), the configuration file can be edited promptly to map the signature of the client requests to a second third party credit check service. On the next client request, then the credit check is automatically redirected by the proxy application to the second third party credit check service, without rebooting the proxy application and without rebooting the messaging middleware platform. This can be done much more rapidly than in conventional systems that may entail modifications of both front-end and back-end configurations to re-direct the credit checks, which can save much revenue that might otherwise be lost during such a temporary retail sales outage.

In another example use case, a front-end application may be the victim of a denial of service attack that results in an excessive volume of client requests from that front-end application to the proxy application. In this event, the configuration file can be edited promptly to comment out the mapping associated with the subject signature. On the next client request from the front-end application under attack, the proxy application fails to find an entry in the configuration file for the signature and consequently drops the request without further processing (i.e., the proxy application ignores the client requests from the front-end application under DoS attack), thereby blocking the propagation of service denial into the back-end applications.

In another example use case, a new application programming interface (API) of a back-end application is deployed and provides access by front-end client applications to new additional features offered by the back-end application. Not all front-end applications, however, are able to redesign and redeploy themselves in concert. In this case, some front-end client applications requesting the service have their requests mapped by the proxy application, in accordance with the configuration file, to the legacy API of the back-end application, and other front-end applications requesting the same service have their requests mapped by the proxy application, in accordance with the configuration file, to the new API of the back-end application.

Turning now to FIG. 1, a system 100 is described. In an embodiment, system 100 comprises a plurality of client applications 102 that execute on server computers 104. These client applications 102 send requests to have business transactions performed on their behalf by service platforms. For example, the client applications 102 send business transaction requests via a network 106 to a messaging middleware computer system 108, and the messaging middleware computer system 108 may send the requests or portions of the requests via the network 106 to business transaction service platforms 112 that execute business transaction applications 110 that may perform or enact the requested business transactions. The network 106 may comprise one or more public networks, one or more private networks, or a combination thereof.

In some contexts, the client applications 102 may be referred to as front-end applications, and the business transaction service platforms 112 and/or the business transaction applications 110 may be referred to as back-end applications. In an embodiment, the client applications 102 and the servers 104 may be abstracted to be part of an enterprise or organization. Some of the business transaction platforms 112 and business transaction applications 110, likewise, may be abstracted to be part of the same enterprise or organization. In an embodiment, some of the business service platforms 112 and business service applications 110 may be provided outside of the enterprise or organization, for example provided by a third party enterprise or organization. In some contexts, the client applications 102 may be said to execute on remote computer systems because the server computers 104 are separate from the messaging middleware computer system 108 and the business transaction service platforms 112.

In an embodiment, the messaging middleware computer system 108 provides a communication layer between the front-end applications and the back-end applications. This communication layer may be said to decouple the front-end applications and the back-end applications, whereby interdependencies between the front-end and back-end are reduced and/or minimized. For example, requests from the client applications 102 may be sent to the messaging middleware computer system 108, and the messaging middleware computer system 108 can take care of the implementation details of interacting with the business transaction platforms 112 and business transaction applications 110 without burdening the client applications 102. For example, the messaging middleware computer system 108 can store messages directed to the business transaction platforms 112 and business transaction applications 110 on one or more messaging queues 124. One or more messaging servers 122 may execute a messaging application 120 that manages the messaging queues 124. The business transaction service platforms 112 and/or business transaction applications 110 may retrieve business transaction requests from the messaging queues 124 via the messaging application 120 as they are ready to process such requests.

The business transaction service platforms 112 and/or business transaction applications 110 may send request replies containing results of business transactions to the messaging middleware computer system 108, for example to the messaging application 120, for return to the requesting client application 102. The messaging application 120 may place the request reply on one of the messaging queues 124. The client applications 102 may retrieve request replies from the messaging queues 124 via the messaging application 120 as they are ready to receive and process such request replies. Using the messaging middleware computer system 108 in this way relieves the front-end applications and back-end applications from the burden of synchronizing their processing and/or messaging with each other.

The messaging middleware computer system 108 further comprises a messaging server 114 that executes a business transaction proxy application 116 and stores a business transaction mapping configuration file 118. In an embodiment, requests transmitted by client applications 102 and/or servers 104 to the messaging middleware computer system 108 route through the business transaction proxy application 116 that mediates the processing performed for and/or the treatment received by business transaction requests based on reading an entry associated with the specific business transaction request stored in the business transaction mapping configuration file 118. It is noted that the business transaction proxy application 116 reads the business transaction mapping configuration file 118 each time it receives a new business transaction request from a client application 102. The business transaction mapping configuration file 118 can be edited by an administration work station 128 or other editing application. In an embodiment, the messaging server 114 further comprises and executes a business transaction proxy monitor application 126 that monitors the processing of the business transaction application 116 and can automatically edit and revise the business transaction mapping configuration file 118.

The business transaction proxy application 116 comprises a plurality of threads of execution, where each thread handles one business transaction request from a client application 102. The business transaction mapping configuration file 118 defines a number of threads of execution for the business transaction monitor application 116, and the business transaction proxy application 116 spawns new threads or kills pre-existing threads to maintain number of threads based on the business transaction mapping configuration file 118. In some contexts the executing threads may be referred to as a pool of threads. When a thread completes processing one business transaction request it picks up another pending business transaction request and processes that request.

The business transaction mapping configuration file 118 further comprises a plurality of entries that each defines a client application request signature and an action, a treatment, or a request handling procedure. Each entry may be said to map a request signature to a corresponding action, treatment, or handling procedure. In an embodiment, a request signature comprises an identity of the client application 102 that has generated the request, an identity of a business transaction service platform 112 designated by the client application 102 to process the request, and an identity of a type of business transaction requested by the client application 102. In another embodiment the request signature may comprise additional information or components. In another embodiment, one or more of the signature components identified above may be replaced by a different component. For example, in an embodiment, the identity of the type of business transaction requested may be replaced by a specific method of a class or object supported by the business transaction application 110. The business transaction requests sent by the client applications 102 to the messaging middleware computer system 108 and to the proxy application 116 comprises at least the components of the request signature, for example at least an identity of the client application 102, an identity of the business transaction service platform 112, and an identity of a type of business transaction. In an embodiment, the business transaction request may comprise additional information, for example input to the business transaction application 110, for example a subscriber identity, an account number, a uniform resource locator (URL), an authentication token, or other.

The action, treatment, or processing that is identified in the entry in the business transaction mapping configuration file 118 may be executing a stubbed-out function by the business transaction proxy application 116 or other application executing on the messaging server 114, executing a script by the business transaction proxy application 116 or other application executing on the messaging server 114, sending the request to the business transaction service platform 112 identified in the request, or sending the request to a business transaction service platform 112 different from the business transaction service platform 112 identified in the request. In an embodiment, the treatment or processing that is identified in the entry in the business transaction mapping configuration file 118 may be to do nothing—to drop the request without further processing. Alternatively, when it is desired to drop a request having a specific signature, the corresponding entry in the business transaction mapping configuration file 118 may be commented out. Alternatively, when it is desired to drop a request having a specific signature, no entry corresponding to the specific signature may be defined in the business transaction mapping configuration file 118. In an embodiment, the configuration file 118 may be written in YAML, a human-readable data serialization language.

The business transaction proxy application 116 may build a business transaction request based on a client application request and based on the action, treatment, or processing that the signature of the subject request is mapped to in the business transaction mapping configuration file 118. The format of this business transaction request may differ in one or more ways from the business transaction request received from the client application 102 by the business transaction proxy application 116. The business transaction request built by the business transaction proxy application 116 may identify a different business transaction platform 112 than that identified in the request from the client application 102, based on the entry in the business transaction mapping configuration file 118 corresponding to the signature in the client request. The business transaction request built by the business transaction proxy application 116 may provide parameters or information for executing the business transaction by the business transaction application 110 that are not provided in the client request sent by the client application 102.

Because the business transaction proxy application 116 reads from the business transaction mapping configuration file 118 when processing every request from the client applications 102, a change to the business transaction mapping configuration file 118 becomes effective almost immediately and without rebooting the business transaction proxy application 116, without rebooting the messaging server 114, and without experiencing downtime in the messaging middleware computer system 108. This may be referred to in some contexts as dynamic class mapping or dynamic method call mapping in some contexts. In an embodiment, all client requests sent by the client applications 102 to the messaging middleware computer system 108 identify the same class method, for example a parse method. The business transaction proxy application 116 may be said to dynamically map this class or class method to processing based on the corresponding entry in the business transaction mapping configuration file 118.

Figure 2A:
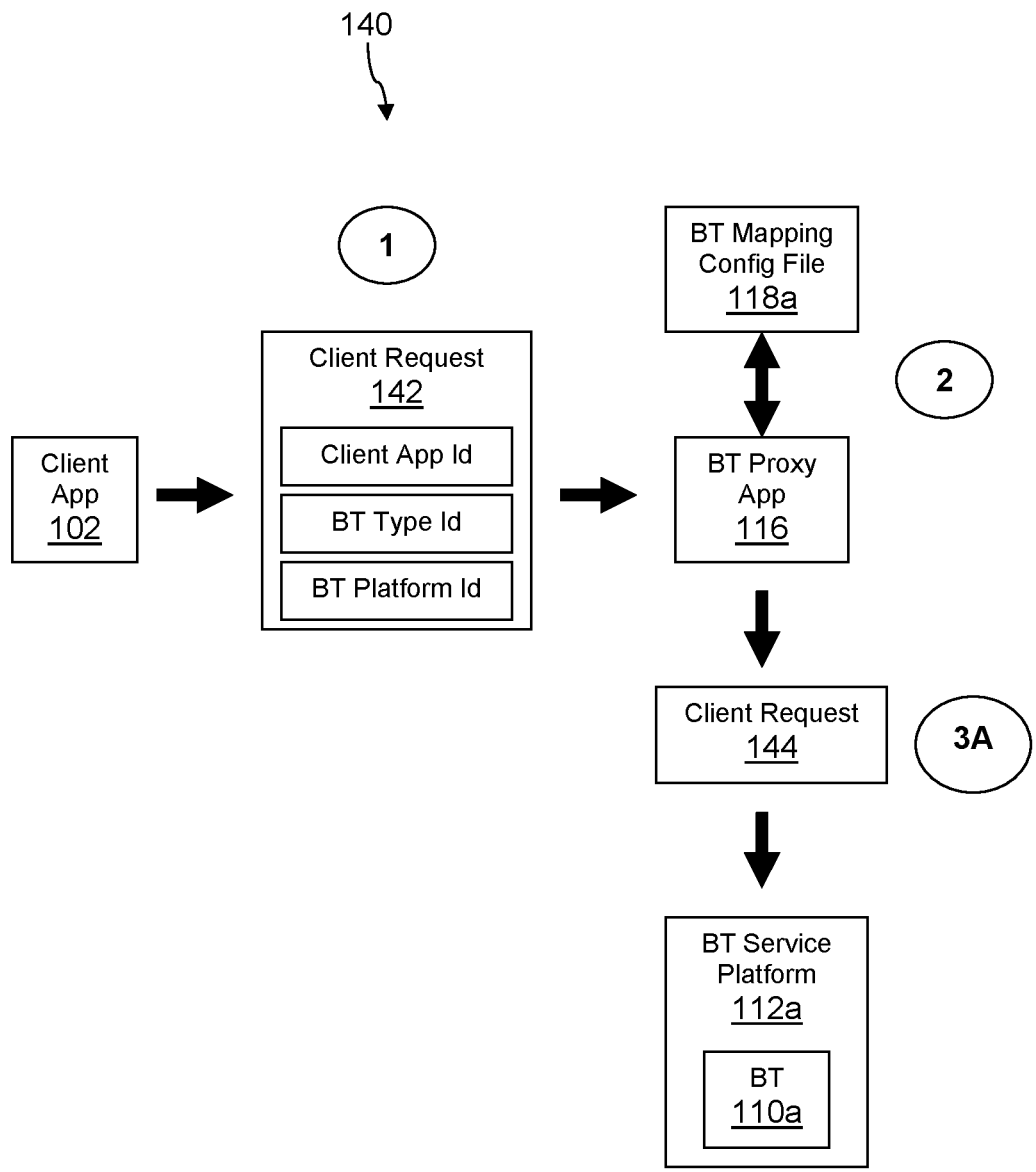
FIG. 2A is a block diagram of a first client business transaction request handling scenario according to an embodiment of the disclosure.

Turning now to FIG. 2A, a first business transaction request handling scenario 140 is described. The client application 102 builds a client request 142 that comprises a client application identity, a business transaction type identity, and a business transaction platform identity. In a first step (1) of the scenario 140, the client application 102 sends this client request 142 via the network 106 to the business transaction proxy application 116. In a second step (2) of the scenario 140 the business transaction proxy application 116 reads an entry having a signature corresponding to the client request 142 (i.e., has a signature comprising the client application identity, the business transaction platform identity, and the business transaction type identity stored in the client request 142) from a first version of the business transaction mapping configuration file 118a. Based on the action, treatment, and/or handling procedure defined in the looked-up entry, in a third step (3A) of the scenario 140, the business transaction proxy application 116 creates a client request 144 based on the client request 142 and sends the client request 144 to a first business transaction service platform 112a to perform an action by a first business transaction application 110a. The first business transaction service platform 112a may be identified in the client request 142.

Figure 2B:
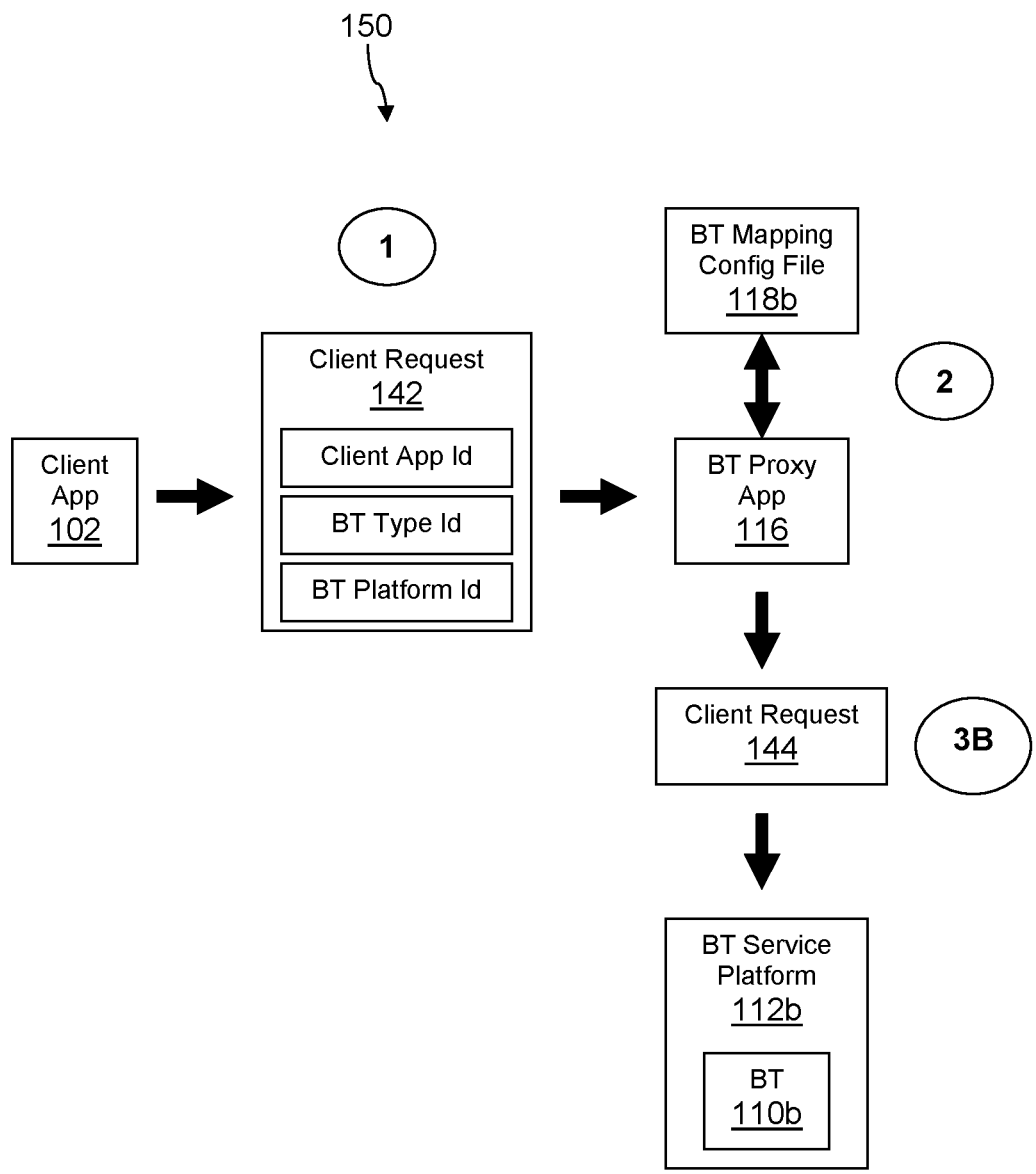
FIG. 2B is a block diagram of a second client business transaction request handling scenario according to an embodiment of the disclosure.

Turning now to FIG. 2B, a second business transaction request handling scenario 150 is described. The first two steps of the scenario 150 are substantially similar to the first two steps of the first scenario 140. In the second scenario 150, however, the business transaction mapping configuration file has been modified to a second version 118b. In this case, when the business transaction proxy application 116 reads the entry having the signature corresponding to the client request 142, the entry is different and identifies a different action, treatment, or handling procedure for the client signature. In a third step (3B) of the second scenario 150, the business transaction proxy application 116 creates a client request 144 based on the client request 142 and sends the client request 144 to a second business transaction service platform 112b to perform an action by a second business transaction application 110b. The second business transaction platform 112b in this scenario is different from the business transaction platform identified in the client request 142.

The second handling scenario 150 may correspond to a case when a third party business transaction handling service platform, for example a first credit checking service, has crashed and is unable to process service requests. Rather than lose retail sales opportunities for the duration of an outage of the first credit checking service, editing the business transaction mapping configuration file to the second version 118b can instead map credit check requests from client applications 102 directed to the down service to an alternate third party credit checking service and avoid losing the retail sales opportunities. The time consumed for editing the configuration file 118 to revise if from first version 118a to second version 118b may consume one minute or less. It may take hours to implement a work around for such a service platform outage in conventional prior art systems.

The second handling scenario 150 can apply in a very wide variety of situations. The failed credit check service work around is only one example. Another example can relate to deploying new versions of business transaction service platforms 112 and/or new versions of business transaction applications 110. Because different client applications 102 may not all be ready to switch over to using the revised business transaction platform 112 and/or revised business transaction application 110 at the same time, in prior art systems the deployment of new and improved business transaction functionality may be dependent on the application 102 that is last to adapt. In the system taught herein, the new business transaction service platform 112 and/or new business transaction application 110 may be deployed while retaining the old business transaction service platform 112 and/or old business transaction application 110. Those client applications 102 ready to use the new business transaction capabilities have their corresponding entries in the business transaction mapping configuration file 118 revised to map to the new business transaction service platform 112 and/or new business transaction application 110 while those client applications 102 that have not yet adopted to the new functionality continue to have their corresponding entries in the business transaction mapping configuration file 118 unchanged and continuing to map to the old business transaction service platform 112 and/or old business transaction application 110.

Figure 2C:
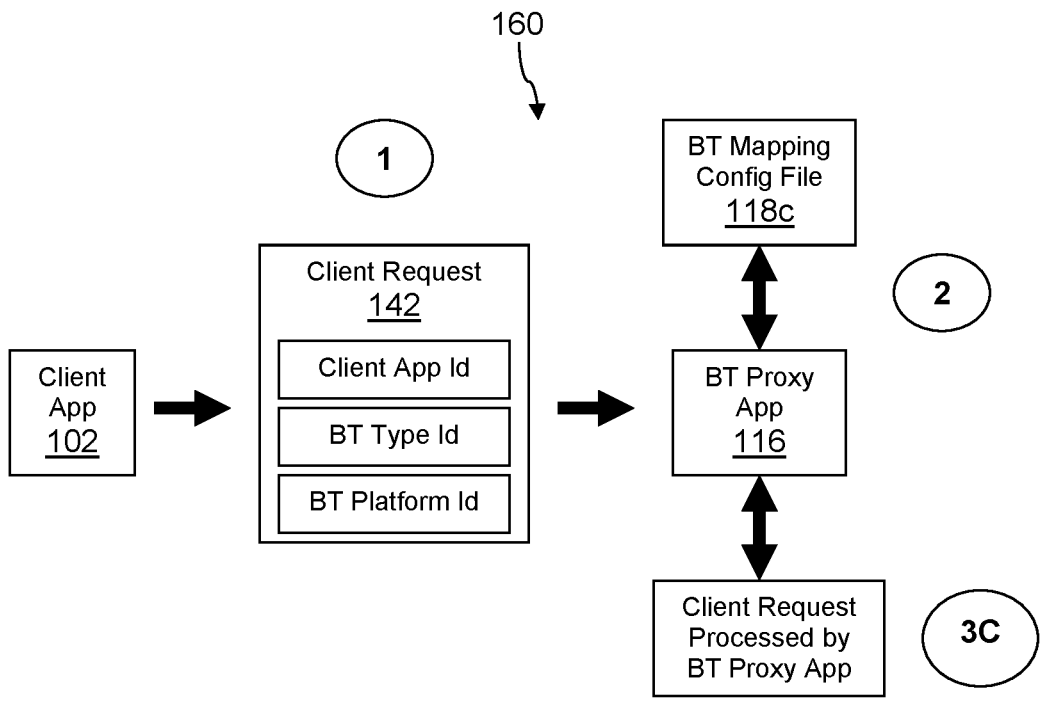
FIG. 2C is a block diagram of a third client business transaction request handling scenario according to an embodiment of the disclosure.

Turning now to FIG. 2C, a third business transaction request handling scenario 160 is described. The first two steps of the scenario 160 are substantially similar to the first two steps of the first scenario 140. In the third scenario 160, however, the business transaction mapping configuration file has been modified to a third version 118c. In this case, when the business transaction proxy application 116 reads the entry having the signature corresponding to the client request 142, the entry is different and identifies a different action, treatment, or handling procedure for the client signature. In this scenario, the entry maps the client signature to a script or method that is executed by the business transaction proxy application 116 and/or to a script or method that is executed on the messaging server 114 rather than being handed off to a business transaction service platform 112 for processing. A variety of situations that may advantageously use this scenario will occur to those of skill in the art. As one example, this scenario may be applied to stub-out a client application 102 request for a business transaction that has not yet been deployed in the back-end, for example during a development phase before deployment into production of the client application 102 and/or of the business transaction application 110. A stubbed-out function may send back a reply in the expected format but containing hard coded, invariable parameter values.

As another example, the third scenario could be used when a credit check business transaction service platform 112 crashes, where the stubbed-out reply provides a hard coded credit approval in response to all credit check requests. In this case the calculation may be made that the losses for possible sales to purchasers that are bad credit risks would be less than loses of sales to good credit risks. The calculation may also rely on the expectation that the outage of the credit check business transaction service platform 112 would be of short duration.

Figure 2D:
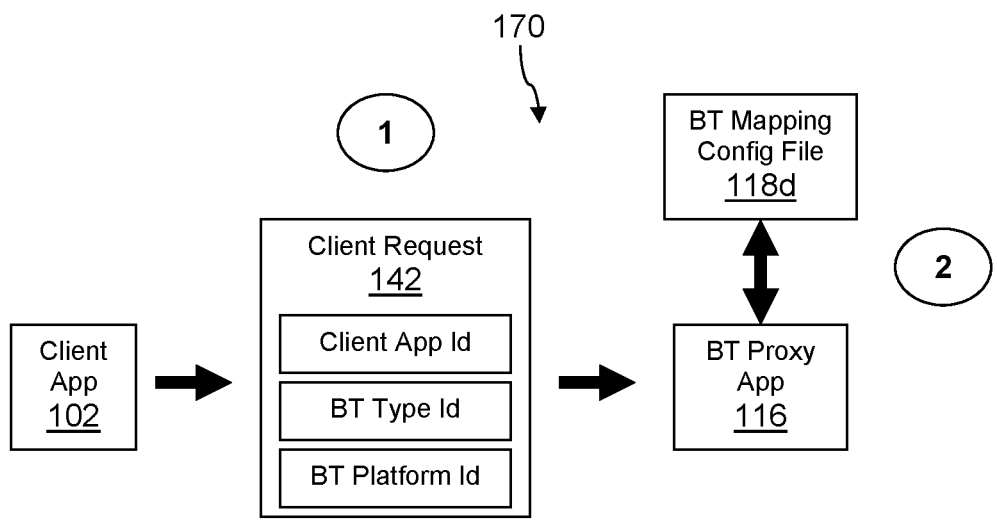
FIG. 2D is a block diagram of a fourth client business transaction request handling scenario according to an embodiment of the disclosure.

Turning now to FIG. 2D, a fourth business transaction request handling scenario 170 is described. The first two steps of the scenario 170 are substantially similar to the first two steps of the first scenario 140. In the fourth scenario 170, however, the business transaction mapping configuration file has been modified to a fourth version 118d. In this case, when the business transaction proxy application 116 reads the entry having the signature corresponding to the client request 142, the entry is different and identifies a different treatment of handling procedure for the client signature. In this scenario, the entry maps the client signature to dropping the client request 142 or not processing the client request 142. Alternatively, the business transaction proxy application 116 finds no entry corresponding to the signature in the client request 142 because the entry has been commented out or deleted from the business transaction mapping configuration file 118. In this case, the business transaction proxy application 116 performs no further processing on the client request 142 and the request is not performed. In this fourth scenario 170, the business transaction proxy application 116 does not place a message on the messaging queue 124 corresponding to the dropped client request, thereby reducing the load on the messaging application 120 and the messaging queues 124. As an example of how the fourth scenario 170 may be useful, in some circumstances a client application 102 may send too many requests 142 to the messaging middleware computer system 108. For example, the client application 102 may be the victim of a denial of service (DoS) cyberattack. Alternatively the client application 102 may be poorly designed and send too many client requests 142.

In an embodiment, the business transaction proxy monitor application 126 may observe the processing of the business transaction proxy application 116 and revise the business transaction mapping configuration file 118 automatically based on this monitoring function. For example, the business transaction proxy monitor application 126 may revise the business transaction mapping configuration file 118 to increase or decrease the number of processing threads in the thread pool of the business transaction proxy application 116 based on a current load of client requests 142. Additionally, the business transaction proxy monitor application 126 may track a rate of client request in-flow for each of the client applications 102 and compare against a threshold. If the client request in-flow rate of a client application 102 exceeds a predefined threshold for that client application 102, the business transaction proxy monitor application 126 may revise the entry corresponding to that client application's signature to be ignored or discarded, at least temporarily.

A different client request in-flow rate threshold may be specified for each different client application 102. Alternatively, some client applications 102 may be associated with a common client request in-flow rate threshold, for example based on membership in a common category of client applications. The client request in-flow rate of a client application 102 may be an average calculated over a moving window of time. For example, the in-flow rate may be calculated as a client request count per second calculated over the most recent minute. Alternatively, the in-flow rate may be calculated as a client request count per ten second time interval calculated over the most recent minute. Alternatively, the in-flow rate may be calculated differently.

As an example, the business transaction proxy monitor application 126 may comment the entry out for one minute and then revise the entry corresponding to the signature of that client application 102 to be effective once again. Alternatively, the business transaction proxy monitor application 126 may impose a longer "time out" duration for the offending client application 102, for example a five minute time out, a ten minute time out, a fifteen minute time out, or some other duration time out. In an embodiment, a stake holder or owner of the subject client application 102 may be obligated to contact an administrator of the messaging middleware computer system 108 and justify the high rate of client requests presented by the subject client application 102 before the administrator manually uncomments the corresponding entry in the business transaction mapping configuration file 118.

In an embodiment, the administrator workstation 128 interface to the business transaction mapping configuration file 118 provides indirect editing access to the business transaction mapping configuration file 118. For example, the administrator workstation 128 interface may perform checking of input commands before actually revising the business transaction mapping configuration file 118, whereby unintended and potentially damaging revisions of the business transaction mapping configuration file 118 are avoided.

Figure 3:
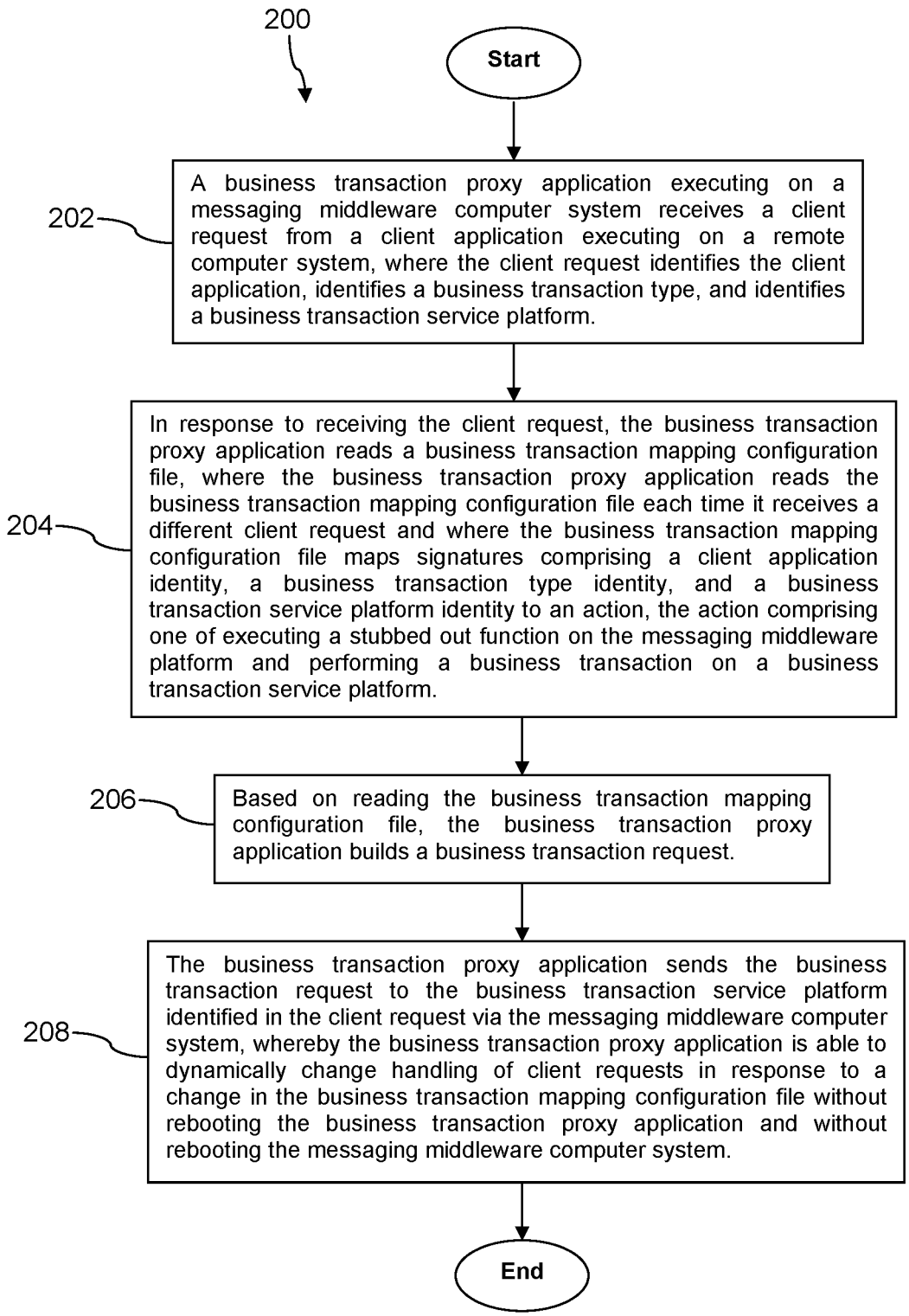
FIG. 3 is a flow chart of a method according to an embodiment of the disclosure.

Turning now to FIG. 3, a method 200 is described. At block 202, a business transaction proxy application executing on a messaging middleware computer system receives a client request from a client application executing on a remote computer system, where the client request identifies the client application, identifies a business transaction type, and identifies a business transaction service platform. At block 204, in response to receiving the client request, the business transaction proxy application reads a business transaction mapping configuration file, where the business transaction proxy application reads the business transaction mapping configuration file each time it receives a different client request and where the business transaction mapping configuration file maps signatures comprising a client application identity, a business transaction type identity, and a business transaction service platform identity to an action, the action comprising one of executing a stubbed out function on the messaging middleware platform and performing a business transaction on a business transaction service platform. In an embodiment, other actions may comprise dropping the client request without any processing (i.e., ignoring the client request) or executing a script in the messaging middleware computer system 108, for example on the messaging server 114.

At block 206, based on reading the business transaction mapping configuration file, the business transaction proxy application builds a business transaction request. At block 208, the business transaction proxy application sends the business transaction request to the business transaction service platform identified in the client request via the messaging middleware computer system, whereby the business transaction proxy application is able to dynamically change handling of client requests in response to a change in the business transaction mapping configuration file without rebooting the business transaction proxy application and without rebooting the messaging middleware computer system.

Figure 4A:
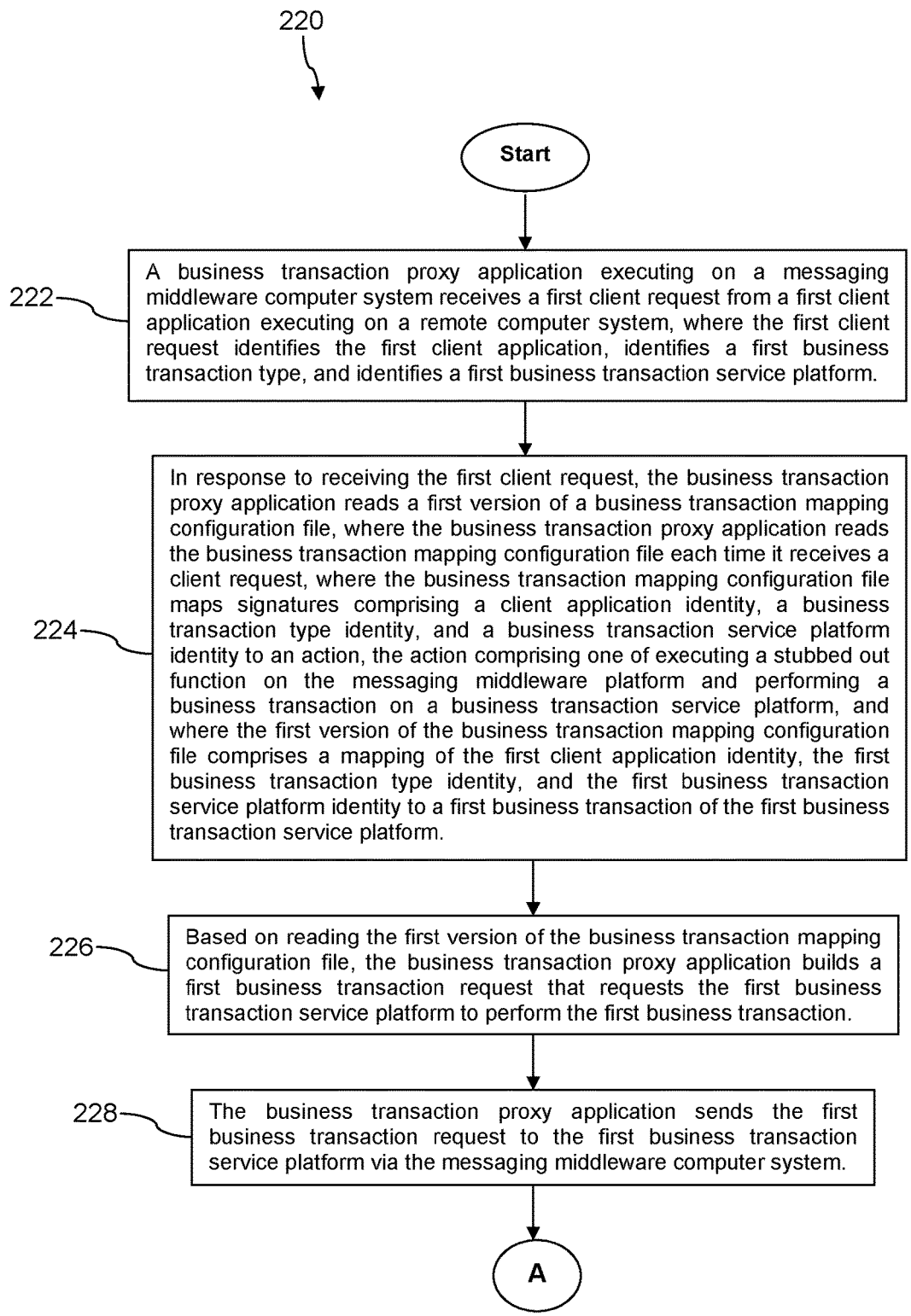
FIG. 4A and FIG. 4B is a flow chart of another method according to an embodiment of the disclosure.
Figure 4B:
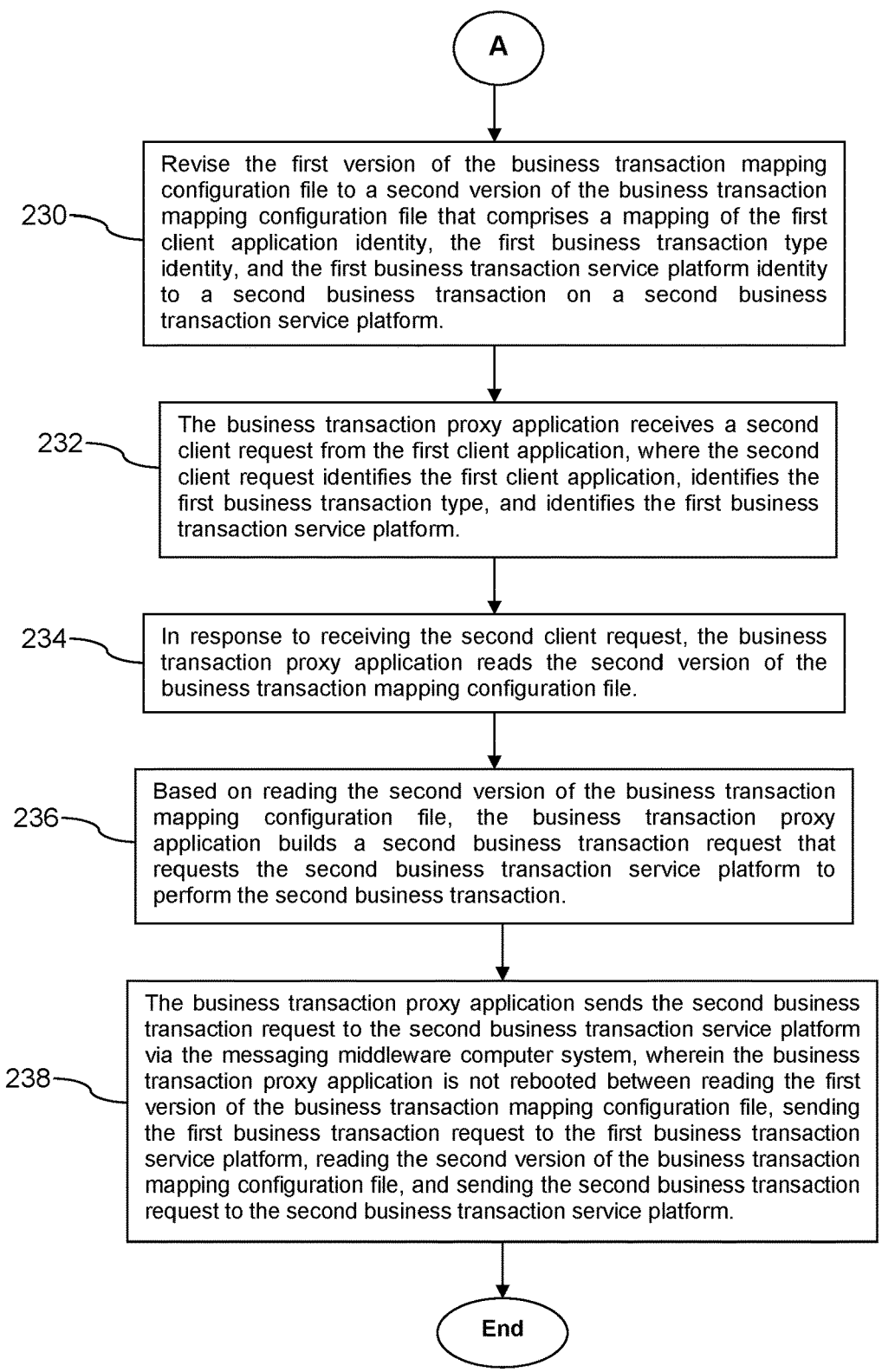

Turning now to FIG. 4A and FIG. 4B, a method 220 is described. At block 222, a business transaction proxy application executing on a messaging middleware computer system receives a first client request from a first client application executing on a remote computer system, where the first client request identifies the first client application, identifies a first business transaction type, and identifies a first business transaction service platform. At block 224, in response to receiving the first client request, the business transaction proxy application reads a first version of a business transaction mapping configuration file, where the business transaction proxy application reads the business transaction mapping configuration file each time it receives a client request, where the business transaction mapping configuration file maps signatures comprising a client application identity, a business transaction type identity, and a business transaction service platform identity to an action, the action comprising one of executing a stubbed out function on the messaging middleware platform and performing a business transaction on a business transaction service platform, and where the first version of the business transaction mapping configuration file comprises a mapping of the first client application identity, the first business transaction type identity, and the first business transaction service platform identity to a first business transaction of the first business transaction service platform. In an embodiment, other actions may comprise dropping the client request without any processing (i.e., ignoring the client request) or executing a script in the messaging middleware computer system 108, for example on the messaging server 114.

At block 226, based on reading the first version of the business transaction mapping configuration file, the business transaction proxy application builds a first business transaction request that requests the first business transaction service platform to perform the first business transaction. At block 228, the business transaction proxy application sends the first business transaction request to the first business transaction service platform via the messaging middleware computer system. At block 230, revise the first version of the business transaction mapping configuration file to a second version of the business transaction mapping configuration file that comprises a mapping of the first client application identity, the first business transaction type identity, and the first business transaction service platform identity to a second business transaction on a second business transaction service platform.

At block 232, the business transaction proxy application receives a second client request from the first client application, where the second client request identifies the first client application, identifies the first business transaction type, and identifies the first business transaction service platform. At block 234, in response to receiving the second client request, the business transaction proxy application reads the second version of the business transaction mapping configuration file.

At block 236, based on reading the second version of the business transaction mapping configuration file, the business transaction proxy application builds a second business transaction request that requests the second business transaction service platform to perform the second business transaction. At block 238, the business transaction proxy application sends the second business transaction request to the second business transaction service platform via the messaging middleware computer system, wherein the business transaction proxy application is not rebooted between reading the first version of the business transaction mapping configuration file, sending the first business transaction request to the first business transaction service platform, reading the second version of the business transaction mapping configuration file, and sending the second business transaction request to the second business transaction service platform.

Figure 5:
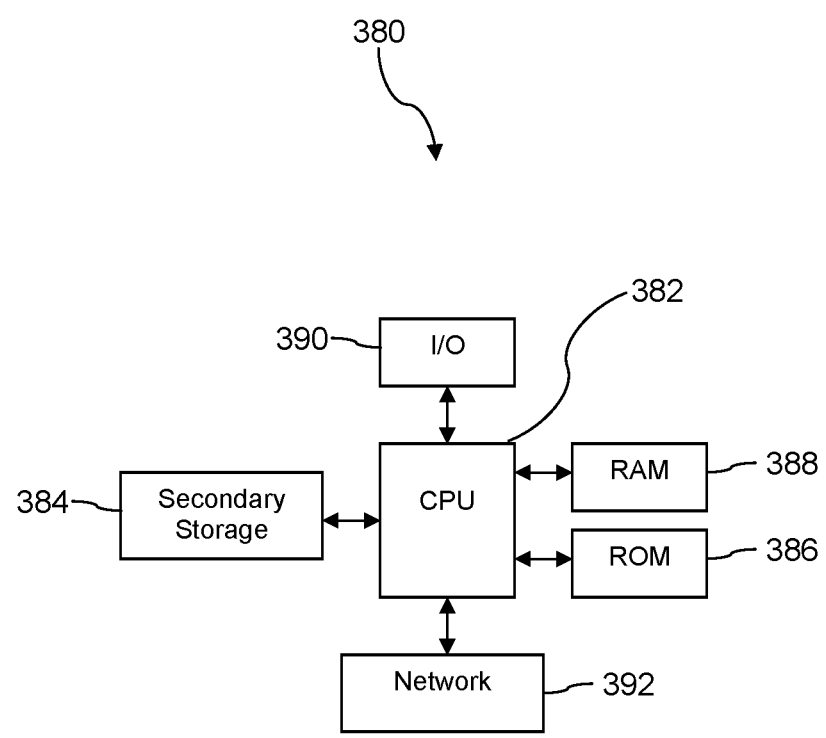
FIG. 5 is a block diagram of a computer system according to an embodiment of the disclosure.

FIG. 5 illustrates a computer system 380 suitable for implementing one or more embodiments disclosed herein. The computer system 380 may be suitable for implementing one or more of the servers 104, the business transaction service platforms 112, the messaging servers 114, 122, and or the messaging queues 124. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of handling requests for service by client applications executing on remote computer systems, comprising:

receiving a first client request by a business transaction proxy application executing on a messaging middleware computer system from a client application executing on a remote computer system to perform a business transaction service, where the client request identifies the client application, identifies a business transaction type, and identifies a first business transaction service platform;

in response to receiving the first client request, reading a business transaction mapping configuration file by the business transaction proxy application, where the business transaction proxy application reads the business transaction mapping configuration file each time it receives a different client request and where the business transaction mapping configuration file maps signatures comprising a client application identity, a business transaction type identity, and a business transaction service platform identity to an action, the action comprising one of executing a stubbed out function on the messaging middleware computer system and performing a business transaction on the business transaction service platform;

based on reading the business transaction mapping configuration file, building a first business transaction request by the business transaction proxy application;

sending, by the business transaction proxy application, the first business transaction request to the first business transaction service platform identified in the client request via the messaging middleware computer system;

receiving a second client request by the business transaction proxy application executing on the messaging middleware computer system from the client application executing on the remote computer system to perform the business transaction service, where the second client request identifies the client application, identifies the business transaction type, and identifies the first business transaction service platform;

in response to receiving the second client request, reading the business transaction mapping configuration file by the business transaction proxy application;

based on reading the business transaction mapping configuration file, building a second business transaction request by the business transaction proxy application; and sending, by the business transaction proxy application, the second business transaction request to a second business transaction service platform based on a modified mapping in the business transaction mapping configuration file without rebooting the business transaction proxy application between reading the business transaction mapping configuration file in response to receiving the first client request, sending the first business transaction request to the first business transaction service platform, reading the business transaction mapping configuration file in response to receiving the second client request, and sending the second business transaction request to the second business transaction service platform and without rebooting the messaging middleware computer system.

2. The method of claim 1, further comprising:
revising the business transaction mapping configuration file to increase a number of threads of execution of the business transaction proxy application; and
launching additional threads of execution by the business transaction proxy application.

3. The method of claim 1, further comprising:
revising the business transaction mapping configuration file to decrease a number of threads of execution of the business transaction proxy application; and
terminating some of a plurality of threads of execution by the business transaction proxy application.

4. The method of claim 1, further comprising:
monitoring the rate of client requests received from client applications executing on remote computer systems by a business transaction proxy monitor application; and
revising the business transaction mapping configuration file by the business transaction proxy monitor application to comment out an entry associated with a signature of a client application that is generating client requests in excess of a predefined threshold.

5. The method of claim 4, further comprising revising the business transaction mapping configuration file by the business transaction proxy monitor application to uncomment out the entry associated with the signature of the client application that was generating client requests in excess of the predefined threshold after expiration of a predefined time-out period.

6. The method of claim 5, wherein the time-out period is about one minute.

7. The method of claim 5, wherein the time-out period is about five minutes.

8. The method of claim 1, further comprising revising the business transaction mapping configuration file to map signatures from the first business transaction service platform to the second business transaction service platform, where the second business transaction service platform is different from the first business transaction service platform, where the first business transaction service platform and the second business transaction service platform both perform at least the business transaction service, and where requests to a crashed business transaction service platform are rerouted to an alternative in-service business transaction service platform by revising the business transaction mapping configuration file to map signatures from the crashed business transaction service platform to the in-service business transaction service platform without rebooting the business transaction proxy application and without rebooting the messaging middleware computer system.

9. The method of claim 8, where the first business transaction service platform is a first credit checking service platform and the second business transaction service platform is a second credit checking service platform.

10. A server computer system, comprising:
a processor;
a non-transitory memory storing a business transaction mapping configuration file, where the business transaction mapping configuration file maps signatures comprising a client application identity, a business transaction type identity, and a business transaction service platform identity to an action, the action comprising one of executing a stubbed out function on a messaging middleware platform or performing a business transaction on a business transaction service platform; and
a business transaction proxy application stored in the non-transitory memory that, when executed by the processor:
receives a first client request from a client application executing on a remote computer system to perform a business transaction service, where the client request identifies the client application, identifies a business transaction type, and identifies a first business transaction service platform, in response to receiving the first client request, reads the business transaction mapping configuration file, where the business transaction proxy application reads the business transaction mapping configuration file each time it receives a different client request, based on reading the business transaction mapping configuration file, builds a first business transaction request, sends, by the business transaction proxy application, the first business transaction request to the first business transaction service platform identified in the client request via the messaging middleware platform, receives a second client request by the business transaction proxy application executing on the messaging middleware computer system from the client application executing on the remote computer system to perform the business transaction service, where the second client request identifies the client application, identifies the business transaction type, and identifies the first business transaction service platform, in response to receiving the second client request, reads the business transaction mapping configuration file by the business transaction proxy application, based on reading the business transaction mapping configuration file, builds a second business transaction request by the business transaction proxy application, and sends the second business transaction request to a second business transaction service platform based on a modified mapping in the business transaction mapping configuration file without rebooting the business transaction proxy application between reading the business transaction mapping configuration file in response to receiving the first client request, sending the first business transaction request to the first business transaction service platform, reading the business transaction mapping configuration file in response to receiving the second client request, and sending the second business transaction request to the second business transaction service platform and without rebooting the messaging middleware computer system.

11. The system of claim 10, wherein a client request that identifies a client application, identifies a business transaction type, and identifies a business transaction service platform that associate to a commented out entry in the business transaction mapping configuration file is dropped without further processing by the business transaction proxy application.

12. The system of claim 10, further comprising a business transaction proxy monitor application stored in the non-transitory memory that, when executed by the processor, monitors a rate of client requests received from client applications executing on remote computer systems; and revises the business transaction mapping configuration file based on monitoring the client requests.

13. The system of claim 12, wherein revising the business transaction mapping configuration file comprises changing a number of business transaction proxy execution threads.

14. The system of claim 12, wherein revising the business transaction mapping configuration file comprises commenting out an entry associated with a client application that is associated with receiving client requests by the business transaction proxy application in excess of a predefined rate.

15. A method of handling requests for service by client applications executing on remote computer systems, comprising:

receiving a first client request by a business transaction proxy application executing on a messaging middleware computer system from a first client application executing on a remote computer system to perform a first business transaction, where the first client request identifies the first client application, identifies a first business transaction type, and identifies a first business transaction service platform;

in response to receiving the first client request, reading a first version of a business transaction mapping configuration file by the business transaction proxy application, where the business transaction proxy application reads the business transaction mapping configuration file each time it receives a client request, where the business transaction mapping configuration file maps signatures comprising a client application identity, a business transaction type identity, and a business transaction service platform identity to an action, the action comprising one of executing a stubbed out function on the messaging middleware computer system and performing a business transaction on the business transaction service platform, and where the first version of the business transaction mapping configuration file comprises a mapping of the first client application identity, the first business transaction type identity, and the first business transaction service platform identity to the first business transaction of the first business transaction service platform;

based on reading the first version of the business transaction mapping configuration file, building a first business transaction request by the business transaction proxy application that requests the first business transaction service platform to perform the first business transaction;

sending by the business transaction proxy application the first business transaction request to the first business transaction service platform via the messaging middleware computer system;

revising the first version of the business transaction mapping configuration file to a second version of the business transaction mapping configuration file that comprises a mapping of the first client application identity, the first business transaction type identity, and the first business transaction service platform identity to a second business transaction on a second business transaction service platform, the first business transaction and the second business transaction providing the same service;

receiving a second client request by the business transaction proxy application from the first client application to perform the second business transaction, where the second client request identifies the first client application, identifies the first business transaction type, and identifies the first business transaction service platform;

in response to receiving the second client request, reading the second version of the business transaction mapping configuration file by the business transaction proxy application;

based on reading the second version of the business transaction mapping configuration file, building a second business transaction request by the business transaction proxy application that requests the second business transaction service platform to perform the second business transaction; and sending by the business transaction proxy application the second business transaction request to the second business transaction service platform via the messaging middleware computer system without rebooting the business transaction proxy application between reading the first version of the business transaction mapping configuration file, sending the first business transaction request to the first business transaction service platform, reading the second version of the business transaction mapping configuration file, and sending the second business transaction request to the second business transaction service platform.

16. The method of claim 15, wherein the action defined in the entries in the business transaction mapping configuration file further comprises executing a script on the messaging middleware computer system.

17. The method of claim 15, further comprising based on reading the second version of the business transaction mapping configuration file spawning additional business transaction proxy execution threads based on a changed definition of number of threads stored in the second version of the business transaction mapping configuration file.

18. The method of claim 15, further comprising based on reading the second version of the business transaction mapping configuration file terminating business transaction proxy execution threads based on a changed definition of number of threads stored in the second version of the business transaction mapping configuration file.

19. The method of claim 15, further comprising commenting out an entry in the business transaction mapping configuration file by a business transaction proxy monitor application, where the entry is associated with the signature of a client application that is generating an excessive rate of client requests.

20. The method of claim 19, further comprising uncommenting out the entry in the business transaction mapping configuration file associated with the signature of the client application that generated an excessive rate of client requests by the business transaction proxy monitor application after expiration of a predefined client application timeout period.

* * * * *